United States Patent
Yamamoto et al.

(10) Patent No.: US 11,760,299 B2
(45) Date of Patent: Sep. 19, 2023

(54) AIRBAG APPARATUS

(71) Applicant: TOYODA GOSEI CO., LTD., Kiyosu (JP)

(72) Inventors: Shuji Yamamoto, Kiyosu (JP); Koji Kawamura, Kiyosu (JP); Motoyuki Tanaka, Kiyosu (JP); Toshihito Yanagisawa, Kiyosu (JP); Yusuke Kojima, Kiyosu (JP); Yusuke Kawamura, Kiyosu (JP); Yuto Hiraiwa, Kiyosu (JP); Yuya Suzuki, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 16 days.

(21) Appl. No.: 17/538,164

(22) Filed: Nov. 30, 2021

(65) Prior Publication Data

US 2022/0194313 A1    Jun. 23, 2022

(30) Foreign Application Priority Data

Dec. 22, 2020   (JP) .................................. 2020-212396

(51) Int. Cl.
    *B60R 21/231*   (2011.01)
(52) U.S. Cl.
    CPC .................. *B60R 21/23138* (2013.01); *B60R 2021/23146* (2013.01)
(58) Field of Classification Search
    CPC ............ B60R 21/207; B60R 21/23138; B60R 2021/23149; B60R 22/023; B60R 2021/161
    See application file for complete search history.

(56) References Cited

U.S. PATENT DOCUMENTS

| | | | |
|---|---|---|---|
| 2017/0028955 A1* | 2/2017 | Ohno | B60R 21/233 |
| 2017/0136976 A1* | 5/2017 | Ohno | B60N 2/888 |
| 2022/0340096 A1* | 10/2022 | Axblom | B60R 21/233 |

FOREIGN PATENT DOCUMENTS

| | | | |
|---|---|---|---|
| JP | 2015-058908 A | | 3/2015 |
| KR | 20200130765 A | * | 11/2020 |

OTHER PUBLICATIONS

Jung et al. KR 2020-0130765 Airbag Apparatus of Vehicle, Machine English Translation, ip.com (Year: 2020).*

* cited by examiner

*Primary Examiner* — Karen Beck
(74) *Attorney, Agent, or Firm* — POSZ LAW GROUP, PLC

(57) ABSTRACT

An airbag apparatus is configured to be used for a vehicle seat including an accommodation portion. The airbag apparatus includes an airbag. The airbag is configured such that a portion of the airbag ejected from the accommodation portion to the position beside the headrest is deployed and inflated in a position rearward of the seat back, and is inflated and deployed away from the accommodation portion in the width direction in a position rearward of the headrest, and that another portion of the airbag ejected from the accommodation portion to the position beside the headrest is deployed and inflated in a position forward of the seat back, and is deployed and inflated in a position forward of a head of an occupant seated in the vehicle seat and away from the accommodation portion in the width direction, so as to wrap around the head.

4 Claims, 3 Drawing Sheets

AIRBAG APPARATUS

BACKGROUND

1. Field

The present disclosure relates to an airbag apparatus that includes an airbag and is configured to protect an occupant from an impact by deploying and inflating the airbag when the impact force is applied to or is predicted to be applied to the vehicle from ahead of the vehicle seat.

2. Description of Related Art

An airbag apparatus is known as an apparatus that protects an occupant from an impact when the impact force is applied to or predicted to be applied to the vehicle from ahead of the vehicle seat. A typical vehicle seat includes an accommodation portion inside the seat back at a center in the width direction or inside the headrest. The airbag apparatus includes an airbag accommodated in the accommodation portion. The airbag includes two inflation portions each provided with a tear seam.

In an airbag apparatus having the above-described configuration, when inflation gas is supplied to the airbag, the airbag is ejected from the accommodation portion while partially remaining in the accommodation portion. Since the inflation portions of the airbag are restrained by the tear seams, the inflation portions are deployed and inflated toward the opposite sides in the width direction of the seat back at the beginning of inflation. Subsequently, when the tear seams rupture, the inflation portions are deployed and inflated into shapes curved along the neck of an occupant on the opposite sides of the neck in the width direction of the seat back. Thus, the neck is restrained by the inflation portions, so as to be protected from the impact.

However, in the typical airbag apparatus described above, when the inflation portions are curved along the neck, the front ends of the inflation portions are spaced apart in the width direction from each other in a position forward of the neck. A gap exists between the front ends of the inflation portions. Thus, when an impact force is applied to the land vehicle from ahead of the land vehicle seat, causing the occupant to start moving forward due to inertia, the neck may slip through the gap between the front ends of the inflation portions. Therefore, there is room for improvement in protection of the occupant from an impact by restricting forward movement of the head.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In a general aspect, an airbag apparatus is provided that is configured to be used for a vehicle seat including an accommodation portion in a side portion in a width direction of a seat back or in a headrest. The airbag apparatus includes an airbag configured to be accommodated in the accommodation portion. The airbag is configured such that when an impact force is applied to or is predicted to be applied to a vehicle from ahead of the vehicle seat, the airbag is inflated by being supplied with an inflation gas to be ejected from the accommodation portion while partially remaining in the accommodation portion to a position beside the headrest in the width direction. Also, the airbag is configured such that a portion of the airbag ejected from the accommodation portion to the position beside the headrest is deployed and inflated in a position rearward of the seat back, and is inflated and deployed away from the accommodation portion in the width direction in a position rearward of the headrest. Further, the airbag is configured such that another portion of the airbag ejected from the accommodation portion to the position beside the headrest is deployed and inflated in a position forward of the seat back, and is deployed and inflated in a position forward of a head of an occupant seated in the vehicle seat and away from the accommodation portion in the width direction, so as to wrap around the head.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, "at least one of A and B" should be understood to mean "only A, only B, or both A and B."

First Embodiment

An airbag apparatus 40 for a front seat of a land vehicle 10 according to a first embodiment will now be described with reference to FIGS. 1 to 3. In the first embodiment, the land vehicle 10, on which the airbag apparatus 40 is mounted, has an autonomous driving feature.

In the following description, the up-down direction refers to the up-down direction of the land vehicle 10 (see, for example, direction description shown in FIG. 1). It is now assumed that an occupant having a size equivalent to a crash test dummy is seated in a normal posture in a land vehicle seat 11.

Figure 1:
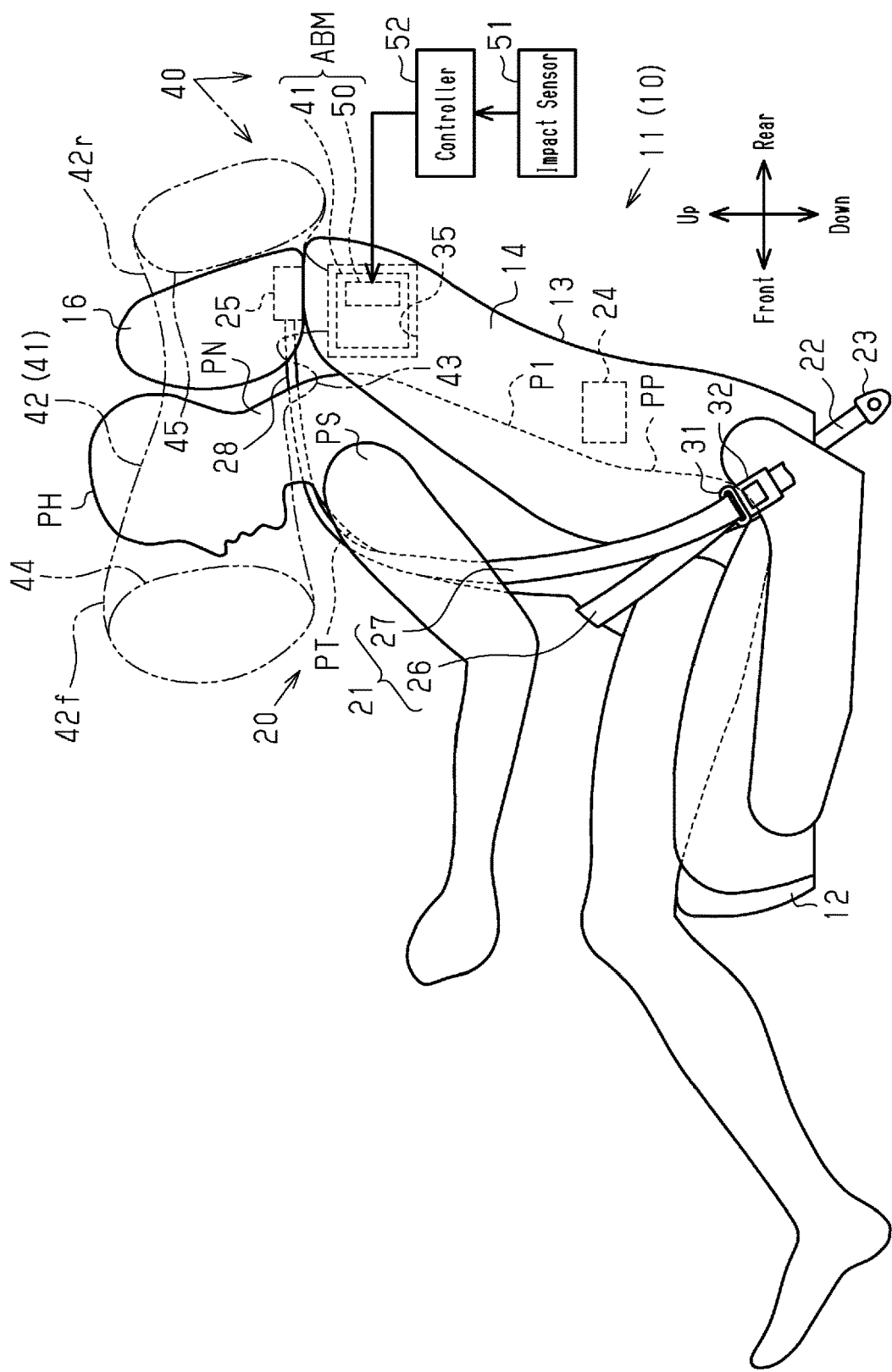
FIG. 1 is a partial side view illustrating an airbag apparatus according to a first embodiment, together with a land vehicle seat, an occupant, and a seat belt device.
Figure 2:
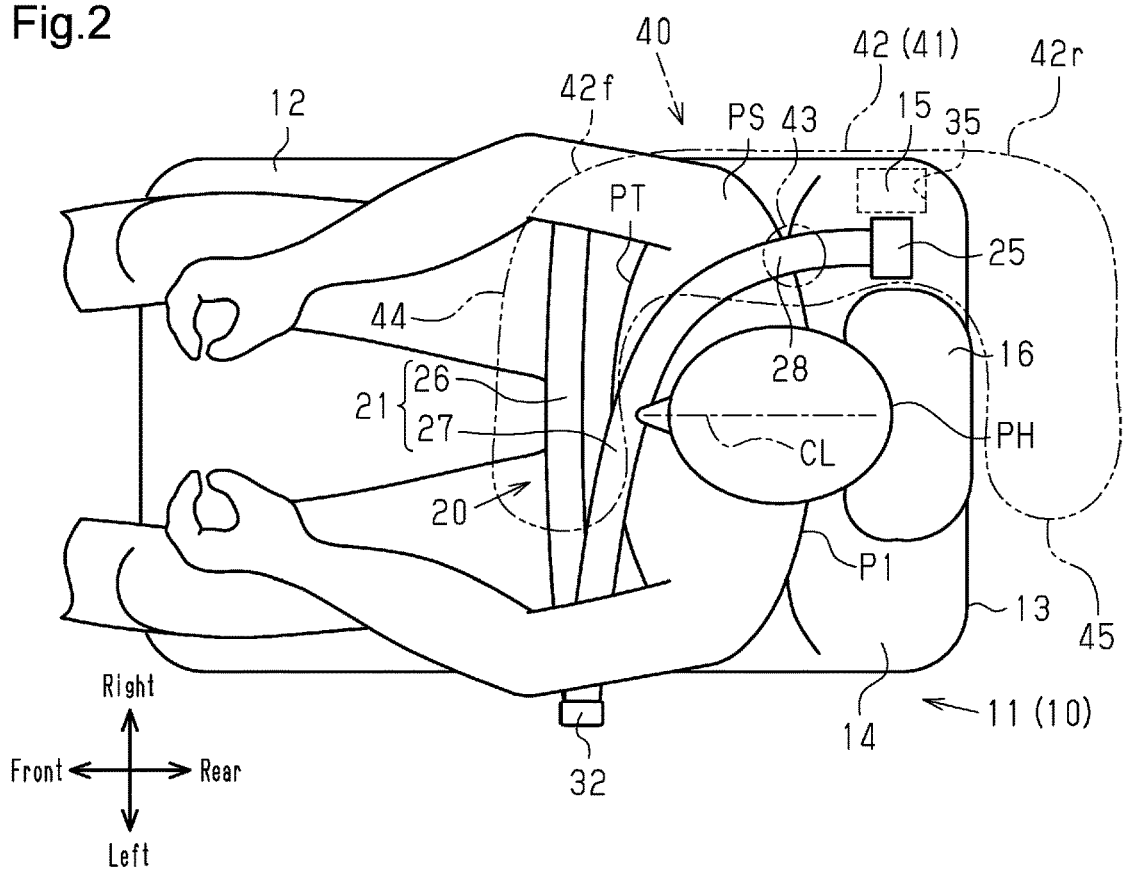
FIG. 2 is a partial plan view illustrating the airbag apparatus according to the first embodiment, together with the land vehicle seat, the occupant, and the seat belt device.

As shown in FIGS. 1 and 2, the land vehicle seat 11, which is a front seat, is disposed in the passenger compartment of the land vehicle 10. The land vehicle seat 11 includes a seat cushion 12, a seat back 13, and a headrest 16. The seat cushion 12 is attached to rails (not shown) installed on the floor of the vehicle body, so as to be adjustable in the front-rear direction of the land vehicle seat 11. The seat back 13 extends upward from the rear part of the seat cushion 12 and is inclined rearward. The inclination angle of the seat back 13 is adjustable.

The land vehicle seat 11 is rotatable about a rotation axis (not shown) that extends in the up-down direction. The orientation of the seat back 13 is adjustable through such rotation. In FIGS. 1 and 2, the seat back 13 is oriented in the forward direction of the land vehicle 10. In this case, the front-rear direction of the land vehicle 10 agrees with the front-rear direction of the land vehicle seat 11. Also, the width direction of the land vehicle seat 11 agrees with the vehicle width direction. If the land vehicle seat 11 is rotated from the state in which the seat back 13 is oriented in the forward direction of the land vehicle 10, the front-rear direction of the land vehicle seat 11 will be diagonal with respect to both the front-rear direction and the vehicle width direction of the land vehicle 10.

Thus, in the following description, the front-rear direction is defined with reference to the front-rear direction of the land vehicle seat 11 unless otherwise specified. Also, the width direction is defined with reference to the width direction of the land vehicle seat 11. Accordingly, the "front-rear direction" refers to the front-rear direction of the land vehicle seat 11. The "width direction" refers to the width direction of the land vehicle seat 11.

In the passenger compartment of the land vehicle 10, a rear land vehicle seat (not shown) is disposed rearward of the land vehicle seat 11.

The land vehicle 10 includes a seat belt device 20, which is configured to restrain an occupant P1 seated in the land vehicle seat 11 to the land vehicle seat 11. The seat belt device 20 includes a seat belt 21, a winder (also referred to as retractor) 24, a tongue 31, and a buckle 32. FIG. 1 shows only part of the buckle 32.

The seat belt 21 is a component that directly restrains the occupant P1, and is also referred to as webbing. An anchor plate 23 is attached to an end 22 of the seat belt 21. The anchor plate 23 is disposed beside the seat cushion 12, and is fixed to a member of the land vehicle seat 11 that has a high strength.

The winder 24 is disposed in the seat back 13, more specifically, in a side portion 15 in the width direction, such that, if the land vehicle seat 11 is rotated or if the seat back 13 is reclined during autonomous driving of the land vehicle 10, the positional relationship with a belt guide 25, which will be discussed below, remains the same. The other end of the seat belt 21 is coupled to the winder 24.

When a tensile force applied to the seat belt 21 exceeds an urging force of the winder 24 that acts to wind up the seat belt 21, the seat belt 21 is extracted from the winder 24. Conversely, when the urging force exceeds the tensile force, the winder 24 winds up the seat belt 21.

Figure 3:
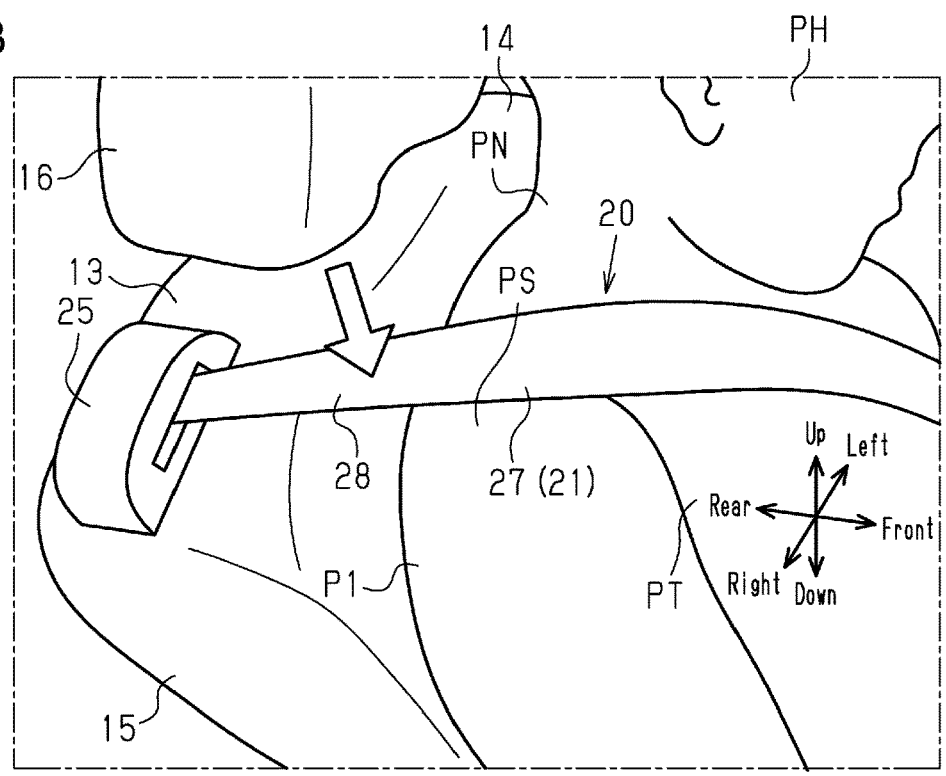
FIG. 3 is a partial perspective view illustrating a state in which the seat belt device restrains the occupant to the land vehicle seat in the first embodiment.

As shown in FIGS. 1 to 3, the belt guide 25 is arranged at the upper end of one of the side portions 14, 15 in the width direction of the seat back 13. In the first embodiment, the belt guide 25 is disposed on top of the side portion 15. The belt guide 25 is attached to a member having a high stiffness in the seat back 13, for example, to the seat frame (not shown). Part of the seat belt 21 extracted from the winder 24 is slidably passed through the belt guide 25 and is disposed in a position forward of the seat back 13.

The tongue 31 is attached to the seat belt 21 to be movable in the longitudinal direction. The buckle 32 is disposed on a side of the seat cushion 12 that is opposite to the anchor plate 23 in the width direction. The buckle 32 is fixed to a member of the land vehicle seat 11 that has a high strength. The tongue 31 is detachably engaged with the buckle 32.

In the seat belt device 20, the tongue 31 is slid on the seat belt 21 to change the lengths of a lap belt portion 26 and a shoulder belt portion 27. The lap belt portion 26 is a portion of the seat belt 21 that extends from the tongue 31 to the end 22 of the seat belt 21 at the anchor plate 23. The lap belt portion 26 extends from one side in the width direction of the lumbar region PP of the seated occupant P1 to the other side across the front of the lumbar region PP.

The shoulder belt portion 27 is a portion of the seat belt 21 that is extracted forward and diagonally downward from the belt guide 25, which is located at the upper end of the side portion 15 of the seat back 13. In other words, the shoulder belt portion 27 is a portion of the seat belt 21 that is located between the belt guide 25 and the tongue 31. The shoulder belt portion 27 extends diagonally from a shoulder PS of the seated occupant P1 at the side portion 15 to a part of the lumbar region PP on the side portion 14 across the front of the thorax PT.

An upper part of the shoulder belt portion 27 is close to and beside the neck PN of the occupant P1. This part of the shoulder belt portion 27 will be referred to as a restrained portion 28 to be distinguished from the remainder.

The seat back 13 includes an accommodation portion 35 in an upper portion of a side portion in the width direction. In the first embodiment, the accommodation portion 35 is provided in the side portion 15. The side portion 15, which is one of the opposite side portions 14, 15 in the width direction, is located on the same side as the restrained portion 28.

The accommodation portion 35 accommodates an airbag module ABM, which is a main part of the airbag apparatus 40. The airbag module ABM includes an airbag 41 and a gas generator 50, which generates inflation gas and supplies it to the airbag 41 through a gas outlet.

There are various types of gas generators that are different in the manner in which inflation gas is generated. In the present embodiment, a pyrotechnic type inflator is employed as the gas generator 50. The gas generator 50 of a pyrotechnic type incorporates a gas generating agent (not shown) that generates inflation gas.

In place of the pyrotechnic type gas generator 50, it is possible to use a stored gas type, which discharges inflation gas by breaking a partition wall of a high-pressure gas cylinder filled with high-pressure gas with a low explosive. Alternatively, a hybrid type in which the pyrotechnic type and stored gas type are combined may be used as the gas generator 50.

The airbag 41 is formed of a woven fabric base of a material having high strength and flexibility to be easily folded. For example, the fabric base is made of polyester threads or polyamide threads. Specifically, the airbag 41 is formed by sewing peripheral parts of the fabric base together using sewing threads.

The airbag 41 is inflated when supplied with inflation gas and is ejected to a position beside the headrest 16 from the accommodation portion 35 while partially remaining in the accommodation portion 35.

The long-dash double-short-dash lines in FIGS. 1 and 2 schematically show a part of the airbag 41 that has been ejected from the accommodation portion 35 and is deployed and inflated beside the headrest 16. This part of the airbag 41 includes a passage portion 42, a front inflation portion 44, and a rear inflation portion 45. The passage portion 42 is continuous with the part of the airbag 41 that remains in the accommodation portion 35. The passage portion 42 is deployed and inflated in the front-rear direction of the land vehicle seat 11. The rear inflation portion 45 is deployed and inflated from a rear end 42r of the passage portion 42 and away from the accommodation portion 35 in the width direction, at a position rearward of the headrest 16.

The front inflation portion 44 is deployed and inflated from a front end 42f of the passage portion 42 and away from the accommodation portion 35 in the width direction to a position forward of the head PH. As shown in FIG. 2, an imaginary line that extends in the front-rear direction and includes the center of gravity of the head PH is defined as a center line CL. The front inflation portion 44 wraps around the head PH by being deployed and inflated in the width direction in a region from the front end 42f of the passage portion 42 to the center line CL and in a region beyond the center line CL. The end of the front inflation portion 44 on the side opposite to the front end 42f is defined as a distal end. The distal end is closer to the side portion 14 than the center line CL.

As shown in FIGS. 1 and 2, a part of the passage portion 42 is located above the restrained portion 28 of the shoulder belt portion 27. This part of the passage portion 42 includes a projecting inflation portion 43, which projects downward to push the restrained portion 28 downward.

At least the gas outlet of the gas generator 50 is located inside the airbag 41. In the first embodiment, the gas generator 50 is entirely accommodated in the airbag 41. Although not illustrated, the airbag 41 is made compact by folding parts different from the part accommodating the gas generator 50. The airbag 41 is folded in this manner in order that it be suitable for being accommodated in the accommodation portion 35, which has a limited size in the seat back 13.

The gas generator 50 is disposed in the accommodation portion 35 together with the airbag 41 and is fastened to the seat frame (not shown) inside the seat back 13.

The airbag apparatus 40 further includes an impact sensor 51 and a controller 52 shown in FIG. 1. The impact sensor 51 includes an acceleration sensor and detects an impact force applied to the land vehicle 10 from ahead of the land vehicle seat 11. The controller 52 controls operation of the gas generator 50 based on a detection signal from the impact sensor 51.

The land vehicle 10 is equipped with an autonomous driving controller (not shown), which drives the land vehicle 10 on behalf of the driver by automatically performing driving operations such as acceleration/deceleration, braking, and steering. The autonomous driving as used in this description includes not only operation of fully automatically driving the land vehicle 10 to a designated destination, but also drive assist that performs part of the operation related to the driving of the land vehicle 10, such as a lane departure prevention function, an inter-vehicle gap keeping function, and a lane control function.

Operation of the first embodiment, which is configured as described above, will now be described. Advantages that accompany the operation will also be described. As a precondition, the occupant P1 seated in the land vehicle seat 11 is assumed to be restrained to the land vehicle seat 11 with the seat belt device 20.

When the Airbag Apparatus 40 is Not Activated

When the impact sensor 51 is not detecting any impact on the land vehicle 10 from ahead of the land vehicle seat 11, the controller 52 does not output to the gas generator 50 an activation signal for activating the gas generator 50. The gas generator 50 thus does not discharge inflation gas. The airbag 41 continues to be accommodated in the accommodation portion 35 in a folded state.

When the Airbag Apparatus 40 is Activated

When an impact force is applied to the land vehicle 10 from ahead of the land vehicle seat 11 due to a collision while the land vehicle 10 is traveling, the body of the occupant P1 starts to move forward due to inertia.

In a land vehicle that does not have the autonomous driving feature, an airbag apparatus is used that includes an airbag incorporated in the steering wheel or the instrument panel in order to protect an occupant in a front seat from the above-described impact. This type of airbag apparatus is configured on the assumption that the seat back extends upward while being oriented in the forward direction of the land vehicle. The airbag is deployed and inflated rearward from the steering wheel or the instrument panel, so as to receive and protect the occupant seated in the front seat.

However, in a land vehicle having the autonomous driving feature, the autonomous driving may be performed with the seat back oriented in the forward direction and reclined. In such a case, the occupant is farther away in the rearward direction from the steering wheel and the instrument panel as the reclining angle increases, as compared to the case of the above-described assumption. The airbag is deployed and inflated at a position away in the forward direction from the occupant in the front seat. Further, the steering wheel and the instrument panel restrict forward movement of the airbag, allowing the airbag to restrict forward movement of the occupant. Accordingly, the reclined seat back delays the time at which the airbag starts protecting the occupant from the impact.

In the first embodiment, the impact sensor 51 detects that an impact of a magnitude greater than or equal to a specific value has been applied to the land vehicle 10 from ahead of the land vehicle seat 11, for example, due to a collision while the land vehicle 10 is traveling. Based on the detection signal of the impact sensor 51, the controller 52 outputs an activation signal to the gas generator 50. In response to the activation signal, the gas generator 50 generates inflation gas. When supplied with the inflation gas, the airbag 41 is inflated while being unfolded (deployed). The upper part of the side portion 15 of the seat back 13 is pushed by the inflated airbag 41 and is broken. The airbag 41 is ejected from the seat back 13 to the outside of the accommodation portion 35 through the broken portion while partially remaining in the accommodation portion 35. In the first embodiment, the airbag 41 is ejected to a position above the side portion 15 and beside the headrest 16. The passage portion 42 of the airbag 41 is deployed and inflated forward and rearward.

When reaching the front end 42f of the passage portion 42, the inflation gas that flows forward within the passage portion 42 is supplied to the front inflation portion 44. The front inflation portion 44 is deployed and inflated at a position forward of the head PH from the front end 42f and away from the accommodation portion 35 in the width direction. The front inflation portion 44 wraps around the head PH by being deployed and inflated in the width direction in the region from the front end 42f to the center line CL and in the region beyond the center line CL. The front inflation portion 44 restrains the head PH, restricting forward movement of the head PH. Since the distal end of the front inflation portion 44 is located at a position closer to the side portion 14 than the center line CL, the first embodiment restricts forward movement of the head PH more effectively than that described in the prior art. Thus, even if the occupant P1 starts moving forward due to inertia of the impact force applied to the land vehicle 10, that movement is properly restricted by the front inflation portion 44 restraining the head PH.

In the first embodiment, the airbag module ABM is accommodated in the accommodation portion 35 as described above. The passage portion 42 and the front inflation portion 44 of the airbag 41 are deployed and inflated at positions close to the head PH of the occupant P1 sitting in the front seat. Thus, the forward movement of the head PH is prevented, so as to improve the occupant protection at an early stage regardless of the inclination angle of the seat back 13. The above-described advantages are achieved shortly after an impact force is applied to the land vehicle 10 regardless of whether the seat back 13 is in an upright state or in a reclined state.

In the first embodiment, the land vehicle seat 11 is the front seat. A rear land vehicle seat is disposed rearward of the land vehicle seat 11. If another occupant is seated in the rear land vehicle seat, the above-described impact causes the head of the occupant in the rear land vehicle seat to start moving forward due to inertia.

In this regard, in the first embodiment, when reaching the rear end 42r of the passage portion 42, the inflation gas that flows rearward within the passage portion 42 is supplied to the rear inflation portion 45. The rear inflation portion 45 is deployed and inflated from a rear end 42r of the passage portion 42 and away from the accommodation portion 35 in the width direction, at a position rearward of the headrest 16. The headrest 16 is located forward of the rear inflation portion 45, and the rear inflation portion 45 is restricted from moving forward by the headrest 16. Accordingly, the head of the occupant in the rear land vehicle seat is received from the front by the rear inflation portion 45, so that the occupant is protected from the impact.

Also, the portion of the airbag 41 that is ejected from the accommodation portion 35 and is deployed and inflated in a position rearward of the seat back 13 prevents the portion that is ejected from the accommodation portion 35 and is deployed and inflated in a position in front of the seat back 13 from rotating about the accommodation portion 35 in a direction in which the front inflation portion 44 moves away from the headrest 16 (the clockwise direction as viewed in FIG. 2). This is because the headrest 16, which is located forward of the rear inflation portion 45, prevents the portion of the airbag 41 that is ejected from the accommodation portion 35 and is deployed and inflated in a position rearward of the seat back 13 from rotating about the accommodation portion 35 toward the headrest 16 (the clockwise direction as viewed in FIG. 2). As described above, the rear inflation portion 45 not only protects the head of the occupant in the rear land vehicle seat, but also contributes to the restraint of the head PH of the occupant P1 in the front seat by the front inflation portion 44.

In a state in which the occupant P1 is restrained to the land vehicle seat 11 by the seat belt device 20, the restrained portion 28 of the shoulder belt portion 27 is located in the vicinity of the neck PN of the occupant P1.

During the autonomous driving of the land vehicle 10, the land vehicle seat 11 may be slightly rotated about the rotation axis, so that the seat back 13 is oriented diagonally forward of the land vehicle 10. Further, in a case in which the seat back 13 is oriented forward of the land vehicle 10, the land vehicle 10 may receive an impact from a position diagonally forward. In either of these cases, the impact force may cause the restrained portion 28 to push the neck PN or to bite into the neck PN.

In this regard, the airbag 41 of the first embodiment includes the projecting inflation portion 43. When the airbag 41 is deployed and inflated, the projecting inflation portion 43 projects downward, pushing the restrained portion 28 downward. This pushing action generates friction between the restrained portion 28 and the projecting inflation portion 43, thereby preventing the restrained portion 28 from approaching the neck PN. Thus, as compared to a case in which the projecting inflation portion 43 is not provided, the restrained portion 28 is less likely to bite into the neck PN.

Particularly, in the first embodiment, the accommodation portion 35 is provided in the side portion 15, which is one of the side portions 14, 15 in the width direction and located on the same side as the restrained portion 28, and the passage portion 42 is partially located above the restrained portion 28. The projecting inflation portion 43 projects downward from the passage portion 42, thereby pushing the restrained portion 28 downward as indicated by the arrow in FIG. 3. In this manner, the inflation gas is guided to the projecting inflation portion 43 via the passage portion 42 to cause the projecting inflation portion 43 to project downward. This eliminates the necessity for a structure for guiding the inflation gas to the projecting inflation portion 43 in the airbag 41.

Second Embodiment

An airbag apparatus 40 according to a second embodiment will now be described with reference to FIG. 4.

In the second embodiment, the accommodation portion 35 of the airbag module ABM is provided in the side portion 14, which is one of the side portions 14, 15 of the seat back 13 in the width direction and is farther from the restrained portion 28 of the shoulder belt portion 27.

Figure 4:
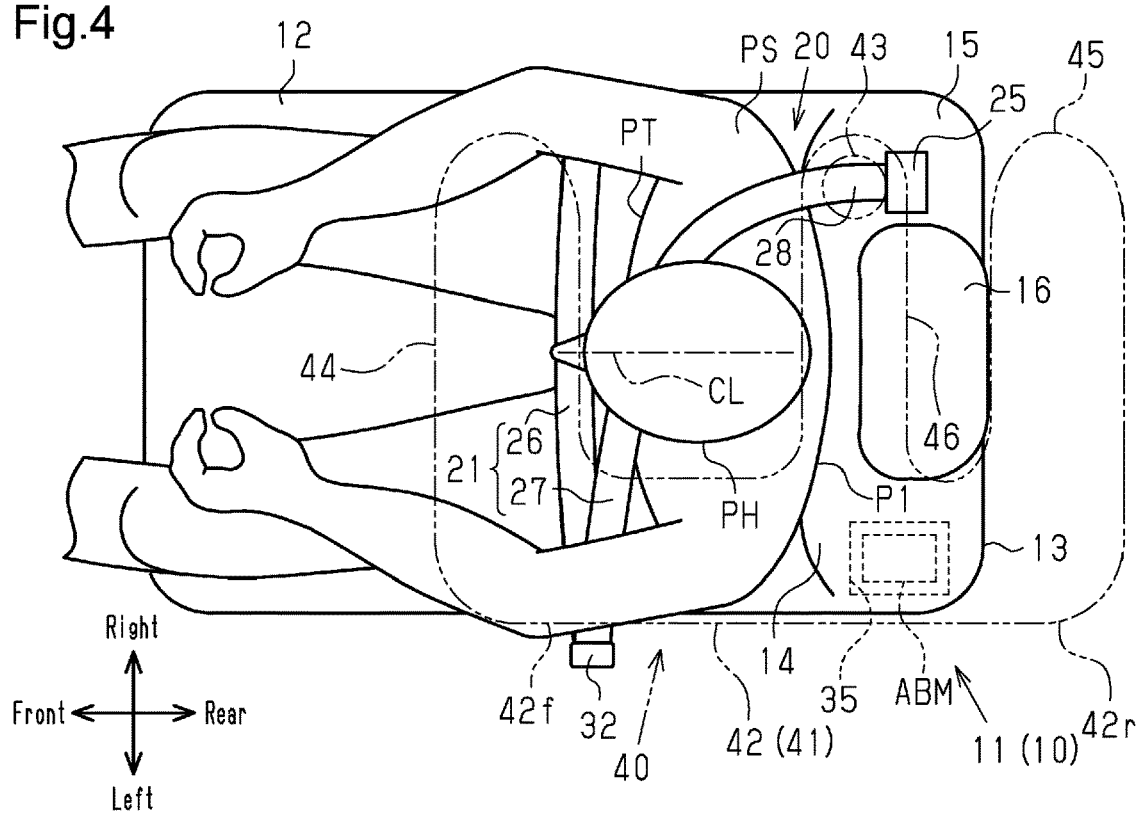
FIG. 4 is a partial plan view corresponding to FIG. 2, illustrating an airbag apparatus according to a second embodiment, together with a land vehicle seat, an occupant, and a seat belt device.

The long-dash double-short-dash line in FIG. 4 schematically illustrates an airbag 41, which has been ejected from the accommodation portion 35 and is deployed and inflated in a position beside the headrest 16, while partially remaining in the accommodation portion 35. The second embodiment is the same as the first embodiment in that the airbag 41 includes a passage portion 42, a front inflation portion 44, and a rear inflation portion 45. However, the passage portion 42 is continuous with a part of the airbag 41 that remains in the accommodation portion 35, the position of which is different from the first embodiment. The passage portion 42 is deployed and inflated both forward and rearward on a side in the width direction opposite to that in the first embodiment, that is, in a position beside the headrest 16 that corresponds to the side portion 14.

Accordingly, the rear inflation portion 45 and the front inflation portion 44 are deployed and inflated in directions opposite to those in the first embodiment. That is, the rear inflation portion 45 is deployed and inflated from the rear end 42r of the passage portion 42 and away from the accommodation portion 35 in the width direction to a position rearward of the headrest 16. Also, the front inflation portion 44 is deployed and inflated from the front end 42f of the passage portion 42 and away from the accommodation portion 35 in the width direction to a position forward of the head PH. The front inflation portion 44 wraps around the head PH by being deployed and inflated in the width direction in a region from the front end 42f of the passage portion 42 to the center line CL and in a region beyond the center line CL.

Further, the airbag 41 includes an auxiliary inflation portion 46 located between the front inflation portion 44 and the rear inflation portion 45. The auxiliary inflation portion 46 is deployed and inflated from an intermediate section in the front-rear direction of the passage portion 42 toward the restrained portion 28 through a gap between the head PH and the headrest 16.

The end of the auxiliary inflation portion 46 on the side opposite to the passage portion 42 is defined as a distal end. The distal end is located above the restrained portion 28. The auxiliary inflation portion 46 includes a projecting inflation portion 43, which projects downward from the distal end, thereby pushing the restrained portion 28 downward.

The airbag 41 includes a delaying portion, which is configured to delay the deployment and the inflation of the auxiliary inflation portion 46. The delaying portion includes, for example, a partition wall (not shown) with a vent hole. Specifically, the auxiliary inflation portion 46 incorporates a partition wall (not shown), which has a vent hole, between the passage portion 42 and the distal end, and the partition wall divides the auxiliary inflation portion 46 into two or more chambers. When flowing from a chamber on the upstream side to a chamber on the downstream side, the inflation gas flows through the vent hole, so that its flow rate is regulated.

The configuration, other than the above, is the same as the first embodiment. Thus, in the second embodiment, the same components as those in the first embodiment are given the same reference numerals, and detailed explanations are omitted.

Although the accommodation portion 35 is provided in the side portion 14, which is one of the side portions 14, 15 in the width direction and farther from the restrained portion 28, the second embodiment achieves the same operations and advantages as the first embodiment.

That is, as in the first embodiment, the passage portion 42 of the second embodiment is ejected from the accommodation portion 35 and is deployed and inflated forward and rearward in a position beside the headrest 16. From the passage portion 42, the auxiliary inflation portion 46 is deployed and inflated toward the restrained portion 28 through the gap between the head PH of the occupant P1 and the headrest 16. The inflation gas flows through the vent hole of the delaying portion, so that its flow rate is regulated. This delays the deployment and the inflation of the auxiliary inflation portion 46.

Thus, the following advantages are achieved if an impact force is applied to the land vehicle 10 from ahead of the land vehicle seat 11 when the occupant P1 is leaning the head PH against the headrest 16. That is, when the occupant P1 moves forward due to inertia so that the head PH moves forward and is spaced apart from the headrest 16, the auxiliary inflation portion 46 can be deployed and inflated between the head PH and the headrest 16. This reduces the force applied to the head PH due to the deployment and the inflation of the auxiliary inflation portion 46 as compared to a case in which the auxiliary inflation portion 46 is deployed and inflated without delay with the head PH leaning against the headrest 16.

Also, the inflation gas in the passage portion 42 flows in the auxiliary inflation portion 46, so as to be guided to the projecting inflation portion 43 at the distal end of the auxiliary inflation portion 46. This inflation gas causes the projecting inflation portion 43 to project downward from the auxiliary inflation portion 46 and push the restrained portion 28 downward. This pushing action generates friction between the projecting inflation portion 43 and the restrained portion 28, thereby preventing the restrained portion 28 from approaching the neck PN. This prevents the restrained portion 28 from biting into the neck PN.

Further, the head PH is held by the front inflation portion 44 and the auxiliary inflation portion 46 from the front and rear. The head PH is thus restrained from the front and rear. The forward and rearward movements of the head PH are restricted more effectively than in a case in which the auxiliary inflation portion 46 is not provided. This further reduces the load on the neck PN of the occupant P1.

The above-described embodiments may be modified as follows. The above-described embodiments and the following modifications can be combined as long as the combined modifications remain technically consistent with each other.

Modifications Related to Seat Belt Device 20

The winder 24 may be provided in a portion of the seat back 13 that is different from the side portion 15. Also, the winder 24 may be provided in a portion of the land vehicle seat 11 that is different from the seat back 13.

Modification Related to Accommodation Portion 35

The accommodation portion 35 does not necessarily need to be located in the side portions 14 or 15 of the seat back 13, but may be located in the headrest 16. In this case, the airbag 41 is ejected to a position beside the headrest 16 from the accommodation portion 35 while partially remaining in the accommodation portion 35.

Modification Related to Gas Generator 50

The gas generator 50 may be disposed in any manner different from that in the first and second embodiments as long as at least the gas outlet is disposed inside the airbag 41. For example, only a part of the gas generator 50 that includes the gas outlet may be accommodated in the airbag 41.

Modifications Related to Airbag 41

The region in which the front inflation portion 44 is deployed and inflated may be changed as long as it extends in the width direction and includes a region from the front end 42f of the passage portion 42 to the center line CL and a region beyond the center line CL. When the distal end of the front inflation portion 44 is located at a position close to the center line CL in the region beyond the center line CL, the front inflation portion 44 is shortest.

The distance of the distal end of the front inflation portion 44 from the center line CL may be increased on the side corresponding to the side portion 14 in the first embodiment. Also, the distance of the distal end of the front inflation portion 44 from the center line CL may be increased on the side corresponding to the side portion 15 in the second embodiment. In these cases, as the length of the front inflation portion 44 is increased, the following advantage is expected. Even if the land vehicle seat 11 is rotated about a rotation axis extending in the up-down direction, or even if an impact force is applied to the land vehicle 10 from a position diagonally forward of the land vehicle seat 11, the head PH is reliably received by the front inflation portion 44. This restricts movement of the head PH in the direction of the impact force.

The front inflation portion 44 may include a portion that is deployed and inflated rearward from the distal end. In this case, the added portion of the front inflation portion 44 and the passage portion 42 hold the head PH in the width direction of the seat back 13, so that movement in the width direction of the head PH is restricted more effectively. Also, when the land vehicle seat 11 is rotated about a rotation axis extending in the up-down direction, or when an impact force is applied to the land vehicle 10 from a position diagonally forward of the land vehicle seat 11, the head PH is protected from the impact more effectively.

The length in the width direction of the rear inflation portion 45 may be equal to or different from the length in the width direction of the front inflation portion 44.

Substantially the entire airbag 41 may be configured to be inflated as in the first and second embodiments, but may also partially include a non-inflation portion, which is neither supplied with inflation gas nor inflated.

The airbag 41 may be configured such that the inside of the passage portion 42 is divided into two or more chambers (inflation chambers). The same modification can be applied to the front inflation portion 44 or to the rear inflation portion 45.

Figure 5:
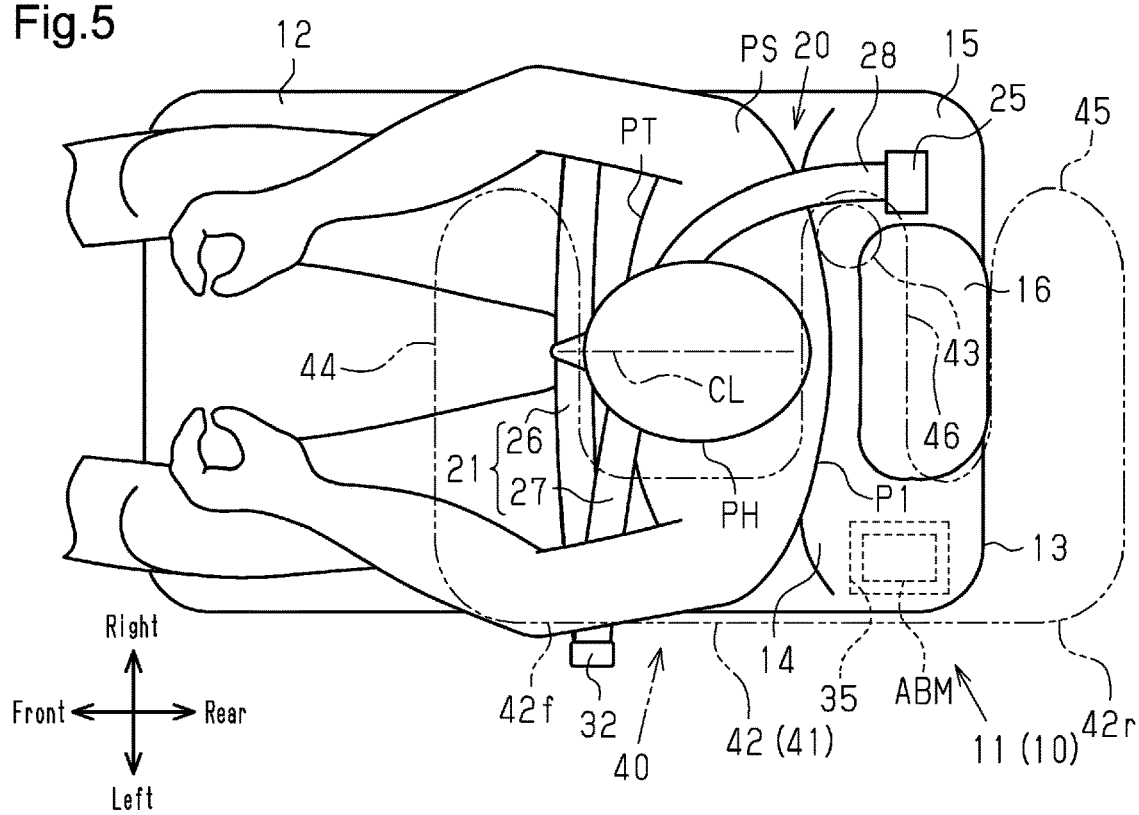
FIG. 5 is a partial plan view corresponding to FIG. 2, illustrating an airbag apparatus according to a modification of the second embodiment, together with a land vehicle seat, an occupant, and a seat belt device.

The position of the projecting inflation portion 43 in the airbag 41 may be changed from the region above the restrained portion 28 to a region between the restrained portion 28 and the neck PN. FIG. 5 illustrates a modification in which the projecting inflation portion 43 is provided at the corresponding position in the auxiliary inflation portion 46 of the second embodiment. In this modification, the projecting inflation portion 43 projects downward into the gap between the restrained portion 28 and the neck PN. The part of the projecting inflation portion 43 in the gap functions as a barrier. The restrained portion 28 contacts the projecting inflation portion 43 so as to be prevented from approaching the neck PN. Thus, in this case also, the restrained portion 28 is prevented from biting into the neck PN as in the second embodiment.

Although not illustrated, the position of the projecting inflation portion 43 may be changed to the region between the restrained portion 28 and the neck PN in FIG. 2, which illustrates the first embodiment. In this case also, the restrained portion 28 is prevented from biting into the neck PN.

The projecting inflation portion 43 may be omitted from the first embodiment if the restrained portion 28 biting into the neck PN is not an issue or can be prevented by other means. The same modification can be applied to the second embodiment.

Applicability

The airbag apparatus 40 may be used for a land vehicle seat in which the headrest 16 and the seat back 13 are integrated.

The above-described airbag apparatus 40 can be employed not only in the land vehicle seat 11, which includes a front seat of the land vehicle 10, but also in a rear land vehicle seat.

Vehicles in which the above-described airbag apparatus 40 can be employed include various industrial vehicles in addition to private cars.

The above-described airbag apparatus 40 may also be applied to an airbag apparatus installed in seats in vehicles other than the land vehicle 10, including aircraft and ships.

Other Modifications

The controller 52 may be changed to have a configuration that outputs an activation signal to the gas generator 50 when the controller 52 predicts that an impact force will be applied to the land vehicle 10 from ahead of the land vehicle seat 11.

The airbag apparatus 40 is particularly advantageous when employed in the land vehicle 10, which has the autonomous driving feature, but may be employed in a manually operated normal land vehicle. Even in this case, the forward movement of the head PH is prevented, so that the occupant protection is improved.

In a case in which the airbag apparatus 40 is employed in a land vehicle that does not have the autonomous driving feature, the winder 24 may be located outside the land vehicle seat.

Also, in a land vehicle like a two-seater coupe, in which the anchor of a seat belt device is located above and diagonally rearward of the seat back, a belt guide may be provided at a position above the side portion corresponding to the anchor. The above-described airbag apparatus can be employed in this land vehicle seat.

In this case, the seat belt of the seat belt device is extracted from a winder located outside the land vehicle seat. The seat belt is passed through the belt guide from behind via the anchor and is guided to a position in front of the seat back. Therefore, the same operation and advantages as those in the first and second embodiments are achieved.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. An airbag apparatus configured to be used for a vehicle seat including an accommodation portion in a side portion in a width direction of a seat back or in a headrest, the airbag apparatus comprising:
   an airbag configured to be accommodated in the accommodation portion, wherein the airbag is configured such that
      when an impact force is applied to or is predicted to be applied to a vehicle from ahead of the vehicle seat, the airbag is inflated by being supplied with an inflation gas to be ejected from the accommodation portion while partially remaining in the accommodation portion to a position beside the headrest in the width direction,
a portion of the airbag ejected from the accommodation portion to the position beside the headrest is deployed and inflated in a position rearward of the seat back, and is inflated and deployed away from the accommodation portion in the width direction in a position rearward of the headrest, and
another portion of the airbag ejected from the accommodation portion to the position beside the headrest is deployed and inflated in a position forward of the seat back, and is deployed and inflated in a position forward of a head of an occupant seated in the vehicle seat and away from the accommodation portion in the width direction, so as to wrap around the head, wherein
a part of the airbag that is ejected from the accommodation portion to the position beside the headrest includes:
a passage portion that is continuous with the portion remaining in the accommodation portion and is configured to be deployed and inflated forward and rearward of the vehicle seat;
a rear inflation portion that is configured to be deployed and inflated from a rear end of the passage portion, away from the accommodation portion in the width direction, and at a position rearward of the headrest; and
a front inflation portion that is configured to be deployed and inflated from a front end of the passage portion, away from the accommodation portion in the width direction, and at a position forward of the head,
the vehicle includes a seat belt device that is configured to restrain the occupant to the vehicle seat with a seat belt,
the seat belt includes a shoulder belt portion that is extracted forward and diagonally downward on the seat back from an upper end of a side portion of the seat back in the width direction,
an upper portion of the shoulder belt portion is defined as a restrained portion,
the airbag includes a projecting inflation portion that is configured to project downward to push the restrained portion downward or to project downward into a gap between the restrained portion and a neck of the occupant,
the accommodation portion is provided in one of side portions of the seat back in the width direction that is on a same side as the restrained portion, and
the projecting inflation portion is provided in the passage portion.

2. The airbag apparatus according to claim 1, wherein
an imaginary line that extends in a front-rear direction and includes a center of gravity of the head is defined as a center line, and
the front inflation portion is configured to wrap around the head by being deployed and inflated in the width direction in a region from the front end of the passage portion to the center line and in a region beyond the center line.

3. An airbag apparatus configured to be used for a vehicle seat including an accommodation portion in a side portion in a width direction of a seat back or in a headrest, the airbag apparatus comprising:
an airbag configured to be accommodated in the accommodation portion, wherein the airbag is configured such that when an impact force is applied to or is predicted to be applied to a vehicle from ahead of the vehicle seat, the airbag is inflated by being supplied with an inflation gas to be ejected from the accommodation portion while partially remaining in the accommodation portion to a position beside the headrest in the width direction,
a portion of the airbag ejected from the accommodation portion to the position beside the headrest is deployed and inflated in a position rearward of the seat back, and is inflated and deployed away from the accommodation portion in the width direction in a position rearward of the headrest, and
another portion of the airbag ejected from the accommodation portion to the position beside the headrest is deployed and inflated in a position forward of the seat back, and is deployed and inflated in a position forward of a head of an occupant seated in the vehicle seat and away from the accommodation portion in the width direction, so as to wrap around the head, wherein
a part of the airbag that is ejected from the accommodation portion to the position beside the headrest includes:
a passage portion that is continuous with the portion remaining in the accommodation portion and is configured to be deployed and inflated forward and rearward of the vehicle seat;
a rear inflation portion that is configured to be deployed and inflated from a rear end of the passage portion, away from the accommodation portion in the width direction, and at a position rearward of the headrest; and
a front inflation portion that is configured to be deployed and inflated from a front end of the passage portion, away from the accommodation portion in the width direction, and at a position forward of the head,
the vehicle includes a seat belt device that is configured to restrain the occupant to the vehicle seat with a seat belt,
the seat belt includes a shoulder belt portion that is extracted forward and diagonally downward on the seat back from an upper end of a side portion of the seat back in the width direction,
an upper portion of the shoulder belt portion is defined as a restrained portion,
the airbag includes a projecting inflation portion that is configured to project downward to push the restrained portion downward or to project downward into a gap between the restrained portion and a neck of the occupant,
the accommodation portion is provided in one of side portions of the seat back in the width direction that is farther from the restrained portion,
the airbag further includes an auxiliary inflation portion that is configured to be deployed and inflated from the passage portion toward the restrained portion through a gap between the head and the headrest, and
the projecting inflation portion is provided in the auxiliary inflation portion.

4. The airbag apparatus according to claim 3, wherein
an imaginary line that extends in a front-rear direction and includes a center of gravity of the head is defined as a center line, and
the front inflation portion is configured to wrap around the head by being deployed and inflated in the width direction in a region from the front end of the passage portion to the center line and in a region beyond the center line.

* * * * *